(12) United States Patent
Redford et al.

(10) Patent No.: US 8,326,682 B2
(45) Date of Patent: Dec. 4, 2012

(54) APPLICATIONS OF CLUSTER ANALYSIS FOR CELLULAR OPERATORS

(75) Inventors: John Redford, Chicago, IL (US); Claudio Taglienti, Barrington Hills, IL (US); Michael Irizarry, Algonquin, IL (US); Narothum Saxena, Hoffman Estates, IL (US)

(73) Assignee: United States Cellular Corporation, Chicago, IL (US)

( * ) Notice: Subject to any disclaimer, the term of this patent is extended or adjusted under 35 U.S.C. 154(b) by 929 days.

(21) Appl. No.: 11/968,008

(22) Filed: Dec. 31, 2007

(65) Prior Publication Data

US 2009/0171717 A1 Jul. 2, 2009

(51) Int. Cl.
  *G06Q 40/00* (2012.01)
(52) U.S. Cl. ..................... 705/7.42; 705/7.11
(58) Field of Classification Search .............. 705/7, 7.11
  See application file for complete search history.

(56) References Cited

U.S. PATENT DOCUMENTS

| | | | |
|---|---|---|---|
| 6,236,365 B1 | 5/2001 | LeBlanc et al. | |
| 6,249,252 B1 | 6/2001 | Dupray | |
| 6,313,786 B1 * | 11/2001 | Sheynblat et al. | 342/357.23 |
| 6,571,279 B1 | 5/2003 | Herz et al. | |
| 6,684,194 B1 * | 1/2004 | Eldering et al. | 705/7.33 |
| 6,879,960 B2 | 4/2005 | Nascenzi et al. | |
| 6,907,310 B2 | 6/2005 | Gardner et al. | |
| 6,952,181 B2 | 10/2005 | Karr et al. | |
| 7,009,511 B2 | 3/2006 | Mazar et al. | |
| 7,043,463 B2 | 5/2006 | Bonabeau et al. | |
| 7,065,409 B2 | 6/2006 | Mazar | |
| 7,092,956 B2 | 8/2006 | Ruediger | |
| 7,127,300 B2 | 10/2006 | Mazar et al. | |
| 7,274,332 B1 | 9/2007 | Dupray | |
| 7,289,761 B2 | 10/2007 | Mazar | |
| 7,292,139 B2 | 11/2007 | Mazar et al. | |
| 7,298,327 B2 | 11/2007 | Dupray et al. | |
| 7,991,661 B1 * | 8/2011 | Gaffney et al. | 705/34 |
| 2009/0097472 A1 * | 4/2009 | Hossain | 370/352 |
| 2009/0171717 A1 * | 7/2009 | Redford et al. | 705/7 |
| 2009/0201199 A1 * | 8/2009 | Preston et al. | 342/357.07 |

* cited by examiner

*Primary Examiner* — Thomas Dixon
*Assistant Examiner* — Benjamin S Fields
(74) *Attorney, Agent, or Firm* — Leydig, Voit & Mayer, Ltd.

(57) ABSTRACT

Subscriber travel behavior is defined using cellular call location data. The defined travel behavior is used to segment the customer population. In a further aspect of the disclosed principles, a method to consolidate numerous of price plans is disclosed wherein price plans are grouped using cluster analysis. In the context of this disclosure, the term "cluster analysis" encompasses a number of different algorithms and methods for grouping objects of similar kind into respective categories to thus organize observed data into meaningful structures. In this context, cluster analysis is a data analysis process for sorting different objects into groups in a way that the degree of association between two objects is maximal if they belong to the same group and minimal otherwise.

19 Claims, 4 Drawing Sheets

APPLICATIONS OF CLUSTER ANALYSIS FOR CELLULAR OPERATORS

TECHNICAL FIELD

This patent disclosure relates generally to cellular data collection and, more particularly to a method and system for market segmentation and price plan consolidation based cellular call behavior types.

BACKGROUND

Traditional means of collecting and utilizing market segmentation data while somewhat effective in isolated cases, are generally less than ideal for most applications, leading to inefficient allocation of marketing resources and efforts. For example, with respect to market segmentation and pricing strategy, it has traditionally been difficult for an Operator to identify and categorize cellular subscribers based on usage patterns, making it difficult to define an optimal pricing strategy related to subscriber usage patterns.

With respect to marketing, it has traditionally been difficult to manage the customer experience in a way that is appropriate based on their call behavior, and to offer optimal pricing for a given Customer. For example, a full-time Homemaker may exhibit different usage patterns and needs than an Owner of a home-based business.

Various aspects of the disclosed principles can remedy these and other deficiencies, although it will be appreciated that the solution of the foregoing deficiencies is not an essential part of the invention. It will be further appreciated that the disclosed principles may be implemented without necessarily solving the above-noted deficiencies, if so desired.

BRIEF SUMMARY OF THE INVENTION

The disclosure describes, in one aspect a method of defining customer travel behavior using cellular call location data. The defined travel behavior is then used to segment the customer population. In a further aspect of the disclosed principles, a method to consolidate numerous of price plans is disclosed. In particular, price plans are grouped using cluster analysis. In the context of this disclosure, the term "cluster analysis" encompasses a number of different standard algorithms and methods for grouping objects of similar kind into respective categories to thus organize observed data into meaningful structures. In this context, cluster analysis is a data analysis process for sorting different objects into groups in a way that the degree of association between two objects is maximal if they belong to the same group and minimal otherwise. Cluster analysis can be used to discover organization within data without necessarily providing an explanation for the groupings. In other words, cluster analysis may be used to discover logical groupings within data.

Certain embodiments of the invention can be applied to proactively design sales programs on the basis of call behavior, e.g., to offer trial subscriptions to items like GPS service. In another aspect, the disclosed system and method allow a reduction from a large number of offered Price Plans into a much smaller set of plans, maintaining nearly the same net revenue. In a further embodiment of the invention, an Operator may categorize cellular price plans on the basis of their average revenue. In general, the disclosed techniques and systems are designed to allow an Operator to reduce the complexity of its systems while improving Customer Experience and maintaining revenue.

DETAILED DESCRIPTION

In one aspect of the disclosed principles, Customer Travel Behavior is defined using cellular call location data. The defined Travel Behavior is then used to segment the Customer Population. In a further aspect of the disclosed principles, a method to consolidate numerous of Price Plans is disclosed. In particular, Price Plans are grouped using Cluster Analysis. In the context of this disclosure, the term "cluster analysis" encompasses a number of different standard algorithms and methods for grouping objects of similar kind into respective categories to thus organize observed data into meaningful structures. In this context, cluster analysis is a common data analysis process for sorting different objects into groups in a way that the degree of association between two objects is maximal if they belong to the same group and minimal otherwise. Cluster analysis can be used to discover organization within data without necessarily providing an explanation for the groupings. In other words, cluster analysis may be used to discover logical groupings within data.

This disclosure introduces the concept of characterization of Customer Behavior using metrics that describe their travel patterns. As a heuristic example of an application of the disclosed principles, consider the travel patterns of nesting birds, honey bees and a mother bear living in a den with her cubs. All three are hunter-gatherers. All three find food and bring it home for their families. All three have similar travel patterns with centroids generally at the location of their homes. On the other hand, consider a herd of Caribou. They all have the same travel pattern, traveling a circuitous route every year, but they have very different travel patterns from the other three creatures.

Thus, nesting birds, honey bees, denned bears and Caribou have numerous distinctions in general, but an analysis of their collective travel patterns can be used to classify them into two distinct travel patterns. Using this type of analysis, it is possible to encompass most cellular users within one of a collection of less than 1000 travel pattern archetypes.

Figure 1:
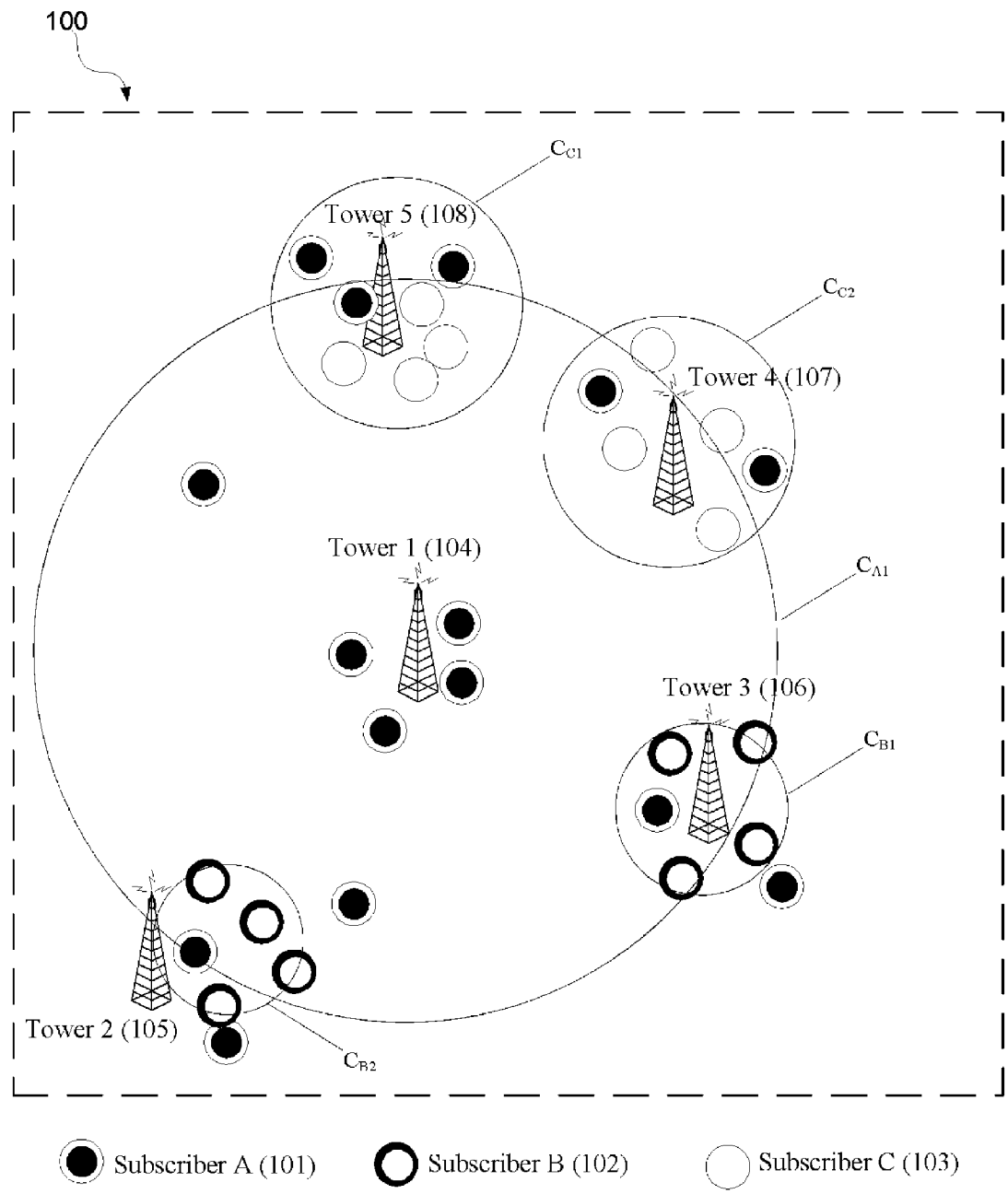
FIG. 1 is a schematic locational diagram of cell towers and call locations, showing centroids and grouping.

Consider the diagram 100 of FIG. 1 depicting the call locations of three hypothetical subscribers, A (101), B (102) and C (103). The color-coded dots indicate the location of their calls during a convenient time interval on an appropriate coordinate grid. By the nature of cellular technology, there is a high likelihood, though not a certainty, that numerous calls placed from the same location will be handled by the same proximate tower. For this reason, typical proximate towers are shown in the neighborhoods of dense calling, regardless of the related subscriber, as shown by Towers 1-5 (104-108) in FIG. 1.

It can be seen that Subscriber A (101) appears to travel widely within the area depicted with a centroid $C_{A1}$ near Tower 1 (104). Meanwhile, Subscriber B (102) makes most of his calls near Tower 2 (105) or Tower 3 (106), as indicated by centroids $C_{B1}$ and $C_{B2}$, or at a location between these two towers. Subscriber C (103) also seems to travel between Tower 4 (107) as indicated by centroid $C_{C1}$, and Tower 5 (108) as indicated by centroid $C_{C2}$. All three subscribers have made approximately the same number of calls during the time scope of the diagram.

Based on the analysis of travel patterns (while calling), Subscribers B (102) and C (103) lead similar lives. However, Subscriber A (101) travels over a noticeably wider area. Also shown in FIG. 1 are the derived centroids of the subscribers' call locations and the outlines of circular clusters for each subscriber. The radius of the Nth circular cluster for Subscriber X is denoted by $C_{XN}$.

Figure 2:
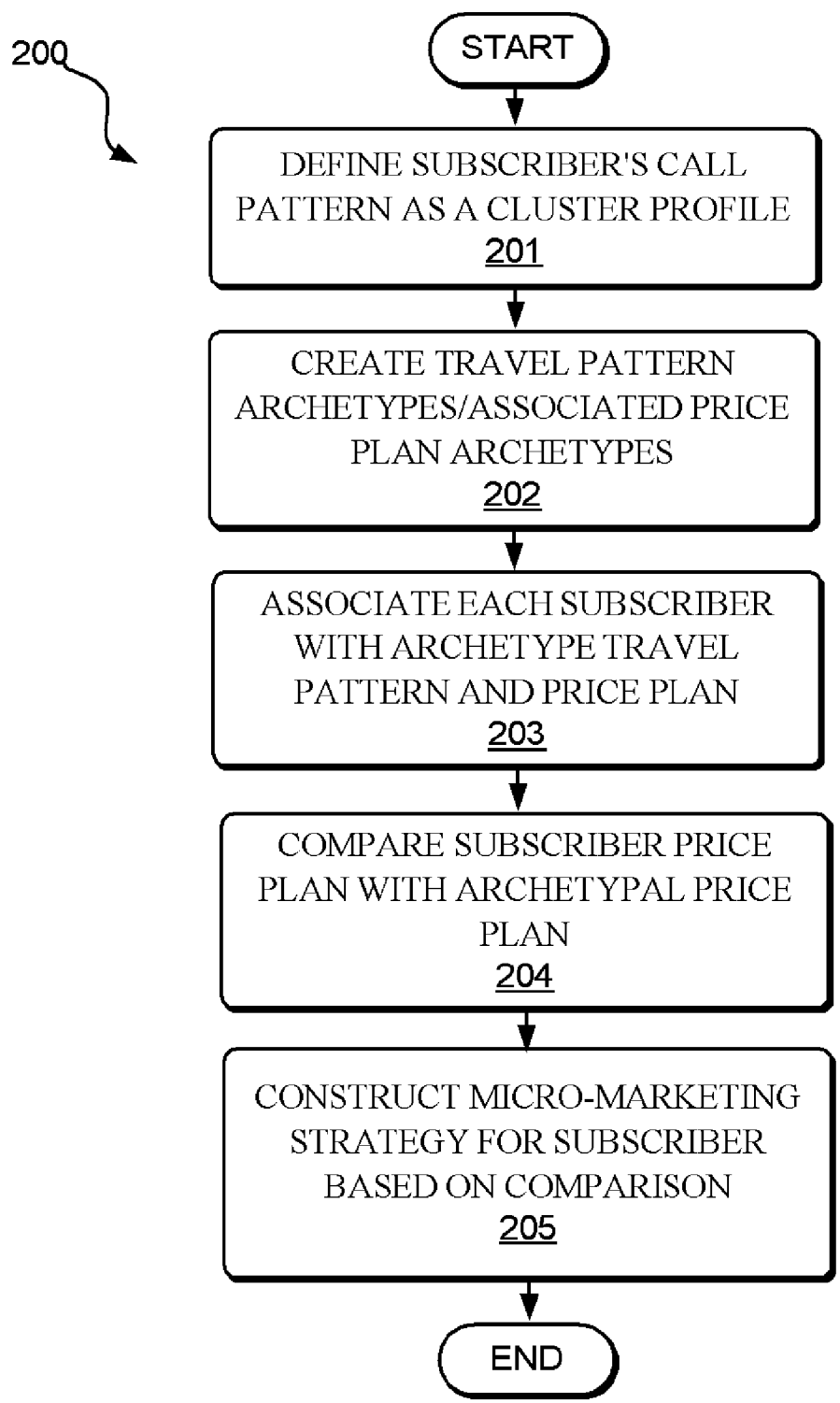
FIG. 2 illustrates in overview a flow chart of a process for deriving and utilizing cluster information according to an embodiment of the invention.

A process 200 for deriving and utilizing cluster information is shown in overview in the flow chart of FIG. 2. At stage 201, the process, which may be executed automatically on a computing device such as a server via the computer execution of computer-readable instructions and data, defines a subscriber's call pattern as a cluster profile, e.g., "soccer mom," 'frequent traveler," etc. Each cluster class will be associated with an archetypal price plan. At stage 202, the process 200 creates travel pattern archetypes and their associated price plan archetypes and in stage 203 associates each subscriber with their Archetype Travel Pattern and Price Plan. At stage 204 the process 200 compares the subscriber's current price plan with archetypal price plan for profitability and net subscriber cost. At stage 205, the process 200 constructs a micro-marketing strategy for the subscriber based on the comparison. It will be appreciated that stages 204 and 205 may be executed in parallel.

Figure 3:
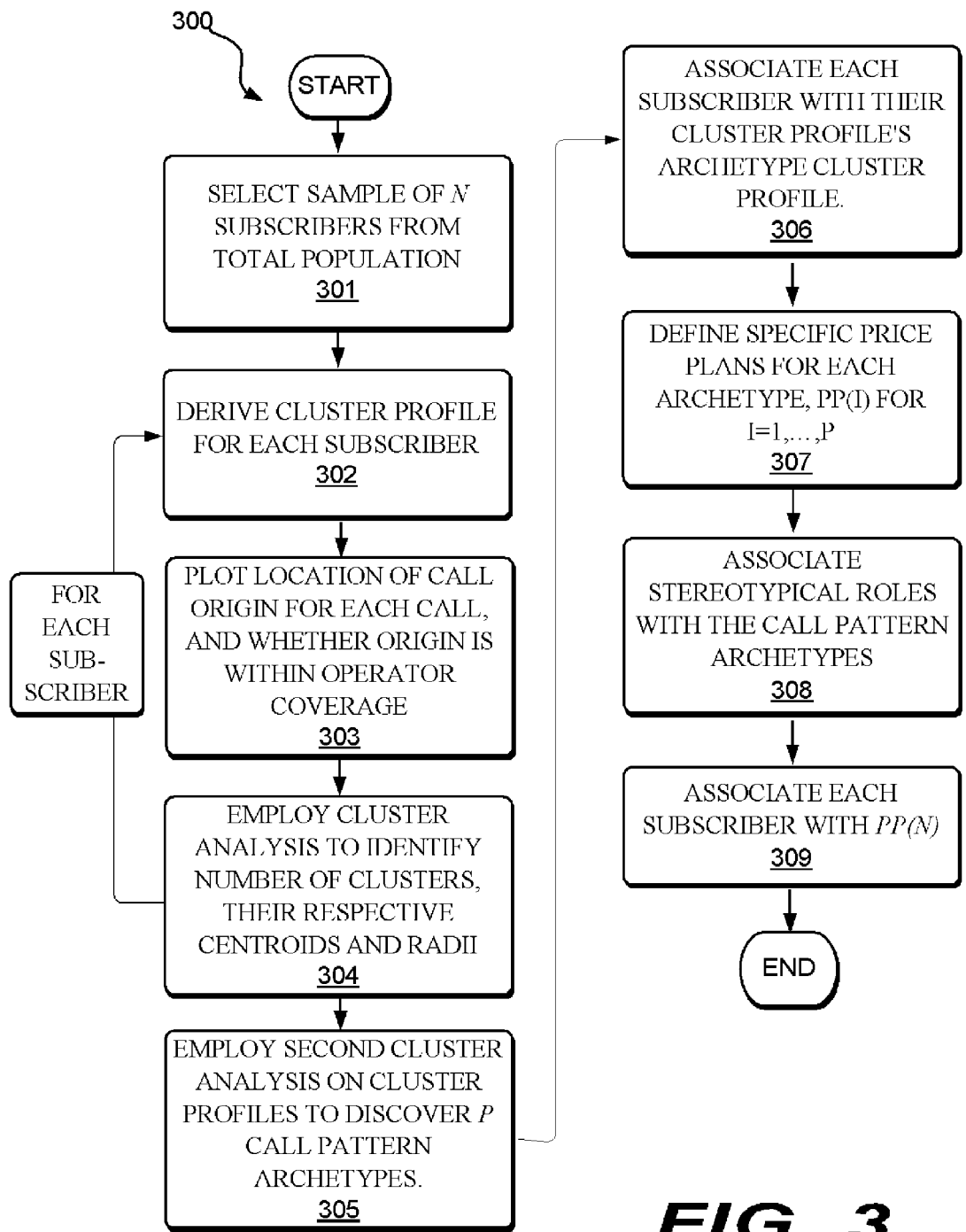
FIG. 3 illustrates in overview a flow chart of a process for defining a subscriber's call pattern as a cluster profile according to an embodiment of the invention.

The flow chart 300 of FIG. 3 illustrates the manner in which the process 200 defines a subscriber's call pattern as a cluster profile. Initially at stage 301, the process selects a sample of N subscribers from the total population. The process derives the cluster profile for each subscriber at stage 302 and plots the location (e.g., Latitude/Longitude of the originating tower) of the call origin for each call (in a specified time interval) along with whether the origin is within the operator coverage at stage 303.

At stage 304, the process 200 employs cluster analysis to identify the number of clusters, their m respective centroids and radii, denoted as $[(C_1, C_{1r}), (C_2, C_{2r}), \ldots (C_m, C_{mr})]$. This could be executed, for example, via a blind random sample of subscribers or by using a structured sample based on other criteria. Stage 302 begins a loop operation for each subscriber in the sample including stages 303 and 304. The main flow of the process resumes at stage 305. At stage 305, the process 200 uses statistical grouping (a second Cluster Analysis) on the cluster profiles to discover P call pattern archetypes.

At stage 306, the process 300 associates each subscriber with their cluster profile's archetype cluster profile. The process 200 defines specific price plans for each archetype, PP(i) for i=1, . . . , P at stage 307 and associates stereotypical roles with the call pattern archetypes at stage 308. Finally, at stage 309 the process 200 associates each subscriber with a PP(n) by calculating their call pattern based on their call history, e.g., their calls made and received over the past three weeks or other period.

Although the variety of archetypal price plans may be set and adjusted based on operator preference, a number of non-limiting and non-exhaustive examples are as follows. An archetype "Soccer Mom" associated with PP(1) may be defined as all calls placed within 20 miles of a single centroid which is the home address. An archetype "Short Commuter" associated with PP(2) may be defined as X% of calls (e.g., 50% of calls) placed at one centroid, the home address, and % of calls (e.g., 30% of calls) placed from the second centroid, the place of employment 20 miles from the home address and 100-X-Y% of calls (e.g., 20% of calls) are placed "at random."

An archetype "Local Business Traveler" associated with PP(3) may be defined as one centroid, the subscriber's business address, and all calls around this centroid within radius N. An archetype "Regional Road Warrior" may be defined by multiple centroids associated with PP(k). Similarly, an archetype "International Road Warrior" may be associated with PP(p).

Figure 4:
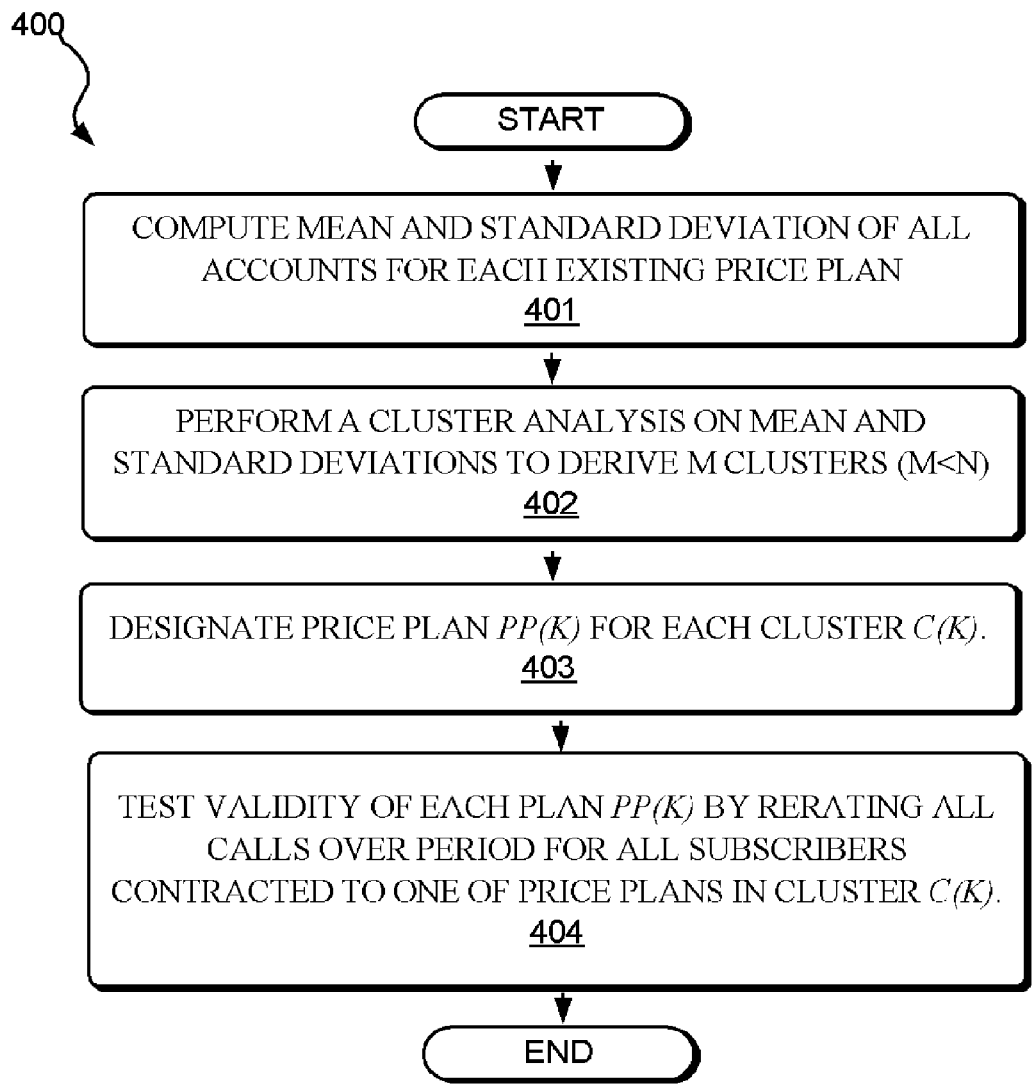
FIG. 4 illustrates a flow chart of a process for designing cluster-based pricing for cellular service according to an embodiment of the invention.

The flow chart 400 of FIG. 4 illustrates a process for designing cluster-based pricing for cellular service. At stage 401, for each existing price plan, the process 400 computes the mean and standard deviation of all accounts associated with it over a suitable number of billing cycles. At stage 402, the process 400 performs a cluster analysis on the derived means and standard deviations $[(\mu_n, \sigma_n)]$. For each of the N existing price plans an operator may have to derive M clusters (M<N). The clusters are denoted as C(k) for k=1, . . . . M. For each cluster C(k), the process 400 designates a newly devised price plan at stage 403 denoted PP(k). Each new plan should satisfy business standards and requirements such that the revenue of each new plan over the same number of billing cycles is expected to have mean and standard deviation of $\mu_k$, and $\sigma_k$ respectively which is the cluster centroid of the associated existing plans. In other words, the aggregated revenue from the accounts in a cluster would be about the same if they were all on the derived Price Plan.

At stage 404, the process 400 tests the validity of each plan PP(k) by rerating all the calls over the period for all subscribers contracted to one of the price plans in the cluster C(k). Although there are a number of suitable ways to execute this step, in an embodiment of the invention, the rerating is executed as follows: for each price plan in C(k), the process 400 (1) selects the subscribers assigned to it (2) re-rate their calls using PP(k), and (3) compares the total revenue and the mean and standard deviation with the expected values. As a result of this comparison, it is expected that for suitable plans the total revenue should be within an acceptable range of the revenue under the original price plans, the mean of the revenue under PP(k) should be within an acceptable range of $\mu_k$, and the standard deviation of the revenue for all subscribers under PP(k) should be approximately $\sigma_k$.

It will be appreciated that the foregoing description provides examples of the disclosed system and technique. However, it is contemplated that other implementations of the disclosure may differ in detail from the foregoing examples. All references to the invention or examples thereof are intended to reference the particular example being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method for creating a customized marketing plan for a subscriber in a cellular network having a current price plan, the method implemented by a computing device executing computer readable instructions causing the computing device to perform a plurality of steps comprising:
- defining, for a subscriber, a call pattern as a cluster profile, the call pattern comprising a plurality of call origin locations of the subscriber;
- creating a plurality of travel pattern archetypes and associating a price plan archetype, respectively, with each of the travel pattern archetypes;
- associating, based on the cluster profile, the subscriber with a travel pattern archetype from the plurality of travel plan archetypes, the travel pattern archetype having an associated price plan archetype;
- comparing, for the subscriber, the current price plan with the associated price plan archetype; and
- constructing a micro-marketing strategy for the subscriber based on the comparing.

2. The method according to claim 1, wherein comparing the current price plan with the associated price plan archetype comprises executing a comparison based on profitability and net subscriber cost.

3. The method according to claim 1, wherein the comparing the current price plan with the associated price plan archetype and constructing the micro-marketing strategy for the subscriber are executed in parallel.

4. The method according to claim 1, wherein the defining a call pattern as a cluster profile comprises:
- selecting a sample of subscribers from a total population;
- for each subscriber, from the sample of subscribers, plotting a location of a call origin for each subscriber call;
- for each subscriber, from the sample of subscribers, employing cluster analysis to identify a number of clusters for the subscriber, wherein clusters are denoted by respective centroids and radii;
- using statistical grouping, on the number of clusters for each subscriber, to identify one or more call pattern archetypes; and
- establishing the cluster profile by associating the call pattern, for the subscriber, with one of the call pattern archetypes.

5. The method according to claim 4, wherein plotting a location comprises plotting a latitude and longitude of an originating tower.

6. The method according to claim 4, wherein the plotting a location of a call origin for each call comprises plotting a location of a call origin for each call in a specified time interval.

7. The method according to claim 4, wherein the plotting a location of a call origin for each call comprises determining whether the call origin is within a coverage space of a predetermined operator.

8. The method according to claim 4, wherein the employing cluster analysis to identify a number of clusters and respective centroids and radii is executed via a blind random sample of subscribers.

9. The method according to claim 4, wherein the employing cluster analysis to identify a number of clusters and respective centroids and radii is executed via a structured sample.

10. The method according to claim 4, further comprising:
- defining a specific price plan for each travel pattern archetype;
- associating a stereotypical role with each call pattern archetype; and
- associating each subscriber with a price plan by calculating the call pattern based on a call history of the subscriber.

11. A computer-readable medium having thereon computer-executable instructions for creating a customized marketing plan for a subscriber in a cellular network having a current price plan, the computer-executable instructions comprising instructions for:
- defining, for a subscriber, a call pattern as a cluster profile, the call pattern comprising a plurality of call origin locations of the subscriber;
- creating a plurality of travel pattern archetypes and associating a price plan archetype, respectively, with each of the travel pattern archetypes;
- associating, based on the cluster profile, the subscriber with a travel pattern archetype from the plurality of travel plan archetypes, the travel pattern archetype having an associated price plan archetype;
- comparing, for the subscriber, the current price plan with the associated price plan archetype; and
- constructing a micro-marketing strategy for the subscriber based on the comparing.

12. The computer-readable medium according to claim 11, wherein the instructions for comparing the current price plan with the associated price plan archetype comprises instructions for executing a comparison based on profitability and net subscriber cost.

13. The computer-readable medium according to claim 11, wherein the instructions for comparing the current price plan with the associated price plan archetype and constructing the micro-marketing strategy for the subscriber are executed substantially in parallel.

14. The computer-readable medium according to claim 11, wherein the instructions for the defining a call pattern as a cluster profile comprises instructions for:
- selecting a sample of subscribers from a total population;
- plotting, for each subscriber from the sample of subscribers, a location of a call origin for each subscriber call;
- employing, for each subscriber from the sample of subscribers, cluster analysis to identify a number of clusters for the subscriber, wherein clusters are denoted by respective centroids and radii for each subscriber;
- using statistical grouping, on the number of clusters for each subscriber, to identify one or more call pattern archetypes; and
- establishing the cluster profile by associating the call pattern, for the subscriber, with one of the call pattern archetypes.

15. The computer-readable medium according to claim 14, wherein the instructions for plotting a location comprise instructions for plotting a latitude and longitude of an originating tower.

16. The computer-readable medium according to claim 14, wherein the instructions for the plotting a location of a call origin for each call comprise instructions for plotting a location of a call origin for each call in a specified time interval.

17. The computer-readable medium according to claim 14, wherein the instructions for the plotting a location of a call origin for each call comprise instructions for determining whether the call origin is within a coverage space of a predetermined operator.

18. The computer-readable medium according to claim 14, wherein the instructions for the employing cluster analysis to identify a number of clusters and respective centroids and radii are executed via a blind random sample of subscribers.

19. The computer-readable medium according to claim 14, further comprising instructions for:
- defining a specific price plan for each travel pattern archetype;
- associating a stereotypical role with each call pattern archetype; and
- associating each subscriber with a price plan by calculating the call pattern based on a call history of the subscriber.

* * * * *